United States Patent
Luo et al.

(10) Patent No.: US 11,424,819 B2
(45) Date of Patent: Aug. 23, 2022

(54) DATA BROADCAST METHOD AND APPARATUS

(71) Applicant: HUAWEI TECHNOLOGIES CO., LTD., Shenzhen (CN)

(72) Inventors: Hejia Luo, Hangzhou (CN); Ying Chen, Hangzhou (CN); Jie Sheng, Hangzhou (CN); Rong Li, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/360,529

(22) Filed: Jun. 28, 2021

(65) Prior Publication Data

US 2021/0328659 A1    Oct. 21, 2021

Related U.S. Application Data

(63) Continuation of application No. PCT/CN2019/129130, filed on Dec. 27, 2019.

(30) Foreign Application Priority Data

Dec. 29, 2018 (CN) .......................... 201811636354.X

(51) Int. Cl.
*H04B 7/185* (2006.01)

(52) U.S. Cl.
CPC ..... *H04B 7/18513* (2013.01); *H04B 7/18523* (2013.01)

(58) Field of Classification Search
CPC ................ H04B 7/185–2041; H04W 56/0045
See application file for complete search history.

(56) References Cited

U.S. PATENT DOCUMENTS

| | | | | |
|---|---|---|---|---|
| 5,640,166 | A | * | 6/1997 | Siwiak .............. H04B 7/208 455/12.1 |
| 5,874,913 | A | * | 2/1999 | Blanchard ........... H04B 7/2125 455/12.1 |

(Continued)

FOREIGN PATENT DOCUMENTS

| | | |
|---|---|---|
| CN | 101915929 A | 12/2010 |
| CN | 102375148 A | 3/2012 |

(Continued)

OTHER PUBLICATIONS

Thales et al.,"NR-NTN: Chap 7.3 NR modifications to support the Non-Terrestrial Network deployment scenarios",3GPP TSG RAN1 Meeting #93 Busan, Korea, May 21-May 25, 2018,R1-1807794,total:43pages.

(Continued)

*Primary Examiner* — Raymond S Dean
(74) *Attorney, Agent, or Firm* — Hauptman Ham, LLP

(57) ABSTRACT

A data broadcast method includes obtaining, by a satellite base station, a plurality of pieces of data that are to be broadcast. The plurality of pieces of data are a same type of data including compensation values of Doppler frequency shifts, change rates of Doppler frequency shifts, transmission delays, change rates of transmission delays, timing advances TAs, change rates of TAs, or angles of a plurality of beams that respectively correspond to a plurality of beams generated by the satellite base station. The satellite base station determines reference data and a difference between each piece of data in the plurality of pieces of data and the reference data. The satellite base station sends first indication information and a plurality of pieces of second indication information to a terminal device. The first indication information indicates the reference data.

20 Claims, 7 Drawing Sheets

(56) References Cited

U.S. PATENT DOCUMENTS

| | | | | |
|---|---|---|---|---|
| 6,058,306 | A | * | 5/2000 | Liu ................. H04B 7/208 |
| | | | | 455/430 |
| 9,973,266 | B1 | * | 5/2018 | Avellan ............ H04B 7/18513 |
| 2003/0222804 | A1 | | 12/2003 | Wilson et al. |
| 2018/0337757 | A1 | * | 11/2018 | Noh .................. H04L 5/0092 |
| 2019/0313357 | A1 | * | 10/2019 | Wang ............... H04W 56/001 |
| 2021/0168871 | A1 | * | 6/2021 | Lee ................... H04L 7/0033 |

FOREIGN PATENT DOCUMENTS

| | | | |
|---|---|---|---|
| CN | 103546402 | A | 1/2014 |
| CN | 103631927 | A | 3/2014 |
| CN | 104316943 | A | 1/2015 |
| CN | 107295036 | A | 10/2017 |
| EP | 0474867 | A1 | 3/1992 |

OTHER PUBLICATIONS

Huawei, HiSilicon et al.,"Discussion on Timing Advance for NTN",3GPP TSG RAN WGI Meeting #95 Spokane, USA, Nov. 12-16, 2018,R1-1813673,total:3pages.

ZTE. Sanechias. Catr et al.,"Discussion on the NR impacts on random access for NTN",3GPP TSG RAN WG1 Meeting #92bis Sanya, China, Apr. 16-20, 2018,R1-1804236,total:3pages.

Thales et al.,"NR-NTN: Impact on Initial TA during random access procedure",3GPP TSG RAN1 Meeting #92-Bis Sanya, China, Apr. 16-20, 2018,R1-1805095,total:7pages.

European Search Report issued in corresponding European Application No. 19903929.8, dated Jan. 10, 2022, pp. 1-10, European Patent Office, Munich, Germany.

Xie Yanhua, Doppler Shift Calculation and Compensation Study in Mobile Satellite Communication System, Dalian University, Jan. 2014, 2 pages.

First Chinese Office Action issued in corresponding Chinese Application No. 201811636354.X, dated Oct. 28, 2020, pp. 1-4.

Chinese Search Report issued in corresponding Chinese Application No. 201811636354.X, dated Oct. 19, 2020, pp. 1-3.

Second Chinese Office Action issued in corresponding Chinese Application No. 201811636354.X, dated Jun. 3, 2021, pp. 1-5.

International Search Report issued in corresponding International Application No. PCT/CN2019/129130, dated Mar. 26, 2020, pp. 1-10.

* cited by examiner

DATA BROADCAST METHOD AND APPARATUS

CROSS-REFERENCE TO RELATED APPLICATIONS

This application is a continuation of International Patent Application No. PCT/CN2019/129130, filed on Dec. 27, 2019, which claims priority to Chinese Patent Application No. 201811636354.X, filed on Dec. 29, 2018, The disclosures of the aforementioned applications are hereby incorporated by reference in their entireties.

TECHNICAL FIELD

This application relates to the field of satellite communications, and more specifically, to a data broadcast method and apparatus.

BACKGROUND

In a satellite communications system, a satellite base station needs to broadcast a large amount of data to a terminal device. For example, the satellite base station broadcasts a timing advance (TA), a compensation value of a Doppler frequency shift, and the like to the terminal device. For a satellite, it usually generates more than one beam, and different beams have different TAs and Doppler frequency shift compensation values. However, in an existing solution, a satellite base station usually directly broadcasts the data, bit overheads are very high, and these bit overheads occupy a large amount of physical resources.

SUMMARY

This application provides a data broadcast method, to reduce physical resource overheads generated when a satellite base station broadcasts data.

According to a first aspect, this application provides a data broadcast method, applied to a satellite communications system. The method includes: obtaining, by a satellite base station, a plurality of pieces of data that need to be broadcast, where the plurality of pieces of data are a same type of data of compensation values of Doppler frequency shifts, change rates of Doppler frequency shifts, transmission delays, change rates of transmission delays, timing advances TAs, change rates of TAs, or angles of a plurality of beams that respectively correspond to the plurality of beams generated by the satellite base station; determining, by the satellite base station, reference data and a difference between each piece of data in the plurality of pieces of data and the reference data based on the plurality of pieces of data; and sending, by the satellite base station, first indication information and a plurality of pieces of second indication information to a terminal device, where the first indication information is used to indicate the reference data, and each piece of second indication information is used to indicate a difference between one piece of data in the plurality of pieces of data and the reference data.

In the technical solutions of this application, the satellite base station determines one piece of reference data based on the plurality of pieces of data that need to be broadcast, and calculates differences between the plurality of pieces of data and the reference data. The differences between the plurality of pieces of data and the reference data have smaller values when compared with these pieces of data, and the differences between the plurality of pieces of data and the reference data also have a smaller value range when compared with these pieces of data. Therefore, compared with directly representing the plurality of pieces of data, representing the reference data and differences between the plurality of pieces of data and the reference data requires a smaller quantity of bits. Therefore, bit overheads for broadcasting the plurality of pieces of data by the satellite base station can be reduced, thereby reducing physical resource overheads.

With reference to the first aspect, in some implementations of the first aspect, the determining, by the satellite base station, reference data and a difference between each piece of data in the plurality of pieces of data and the reference data based on the plurality of pieces of data includes: sorting, by the satellite base station, the plurality of pieces of data in ascending or descending order, determining, as the reference data, the first piece of data or the last piece of data in a first sequence obtained through sorting, and calculating a difference between every two adjacent pieces of data in the first sequence, where each piece of second indication information is used to indicate the difference between every two adjacent pieces of data in the first sequence.

It should be understood that, after the satellite base station sorts, in ascending or descending order, the plurality of pieces of data that need to be broadcast, the difference between every two adjacent pieces of data has a smaller value when compared with the plurality of pieces of data. Therefore, a total quantity of bits required for representing one piece of reference data and the differences between the plurality of pieces of data and the reference data is less than a quantity of bits required for directly representing the plurality of pieces of data.

It should be noted that, after the plurality of pieces of data are sorted in ascending order or descending order, and then the difference between two adjacent pieces of data is calculated, so that the difference between two adjacent pieces of data can be reduced, thereby reducing a quantity of bits required for broadcasting the differences.

For example, respective compensation values of Doppler frequency shifts of the plurality of beams generated by the satellite base station are different from each other, but these compensation values fluctuate from a negative number to a positive number, and compensation values of adjacent beams have a small difference. Therefore, the compensation values of the Doppler frequency shifts of the beams are sorted in ascending or descending order, and the satellite base station broadcasts only a difference between compensation values of two adjacent beams after sorting, and broadcasts the first compensation value or the last compensation value after sorting, to reduce a quantity of bits required for directly broadcasting the compensation values of the Doppler frequency shifts of these beams.

With reference to the first aspect, in some implementations of the first aspect, the determining, by the satellite base station, reference data and a difference between each piece of data in the plurality of pieces of data and the reference data based on the plurality of pieces of data includes: determining, by the satellite base station, a common part of the plurality of pieces of data, and calculating a difference between each piece of data in the plurality of pieces of data and the common part; and sorting, by the satellite base station, the differences between the plurality of pieces of data and the common part in ascending or descending order, determining, as the reference data, the first difference or the last difference in a second sequence obtained through sorting, and calculating a difference between every two adjacent values in the second sequence, where the first indication information is used to indicate the first difference or the last difference in the second sequence, and each piece of second indication information is used to indicate the difference between every two adjacent differences in the second sequence. The method further includes: sending, by the satellite base station, third indication information to the terminal device, where the third indication information is used to indicate the common part.

It should be understood that the common part of the plurality of pieces of data may be, for example, one piece of data, with a smallest value, of the plurality of pieces of data. In this embodiment, before sorting the plurality of pieces of data in ascending or descending order, the satellite base station first extracts the common part from the plurality of pieces of data, and represents a value of the common part by using the third indication information. In addition, the satellite base station sorts, in ascending or descending order, values obtained after the common part is subtracted from the plurality of pieces of data, determines the reference data from the second sequence obtained through sorting, and represents the reference data by using the first indication information. Moreover, the satellite base station uses the plurality of pieces of second indication information to separately indicate the difference between every two adjacent values in the second sequence.

It should be noted that, considering characteristics of data, such as the compensation values of Doppler frequency shifts, the change rate of the compensation values of Doppler frequency shifts, the change rates of the transmission delays, the change rates of TAs, and the beam angles of the plurality of beams generated by the satellite base station, processing of extracting the common part described in this embodiment, especially when applied to data such as a TA, a satellite orbital altitude, and a transmission delay, can effectively reduce a quantity of bits required for representing the data.

With reference to the first aspect, in some implementations of the first aspect, the determining, by the satellite base station, a common part of the plurality of pieces of data includes: determining, by the satellite base station, one piece of data, with a smallest value, of the plurality of pieces of data as the common part; determining, by the satellite base station, an average value of the plurality of pieces of data as the common part; or determining, by the satellite base station, an agreed value as the common part based on values of the plurality of pieces of data.

With reference to the first aspect, in some implementations of the first aspect, before the sending, by the satellite base station, third indication information to the terminal device, the method further includes: determining, by the satellite base station based on a mapping relationship that is between n pieces of discrete data and n pieces of indication information and that is agreed on with the terminal device, third indication information corresponding to the common part, where a correspondence between the n pieces of discrete data and the n pieces of indication information is agreed on in the mapping relationship. Each piece of indication information is used to indicate corresponding discrete data, the n pieces of discrete data include the common part, a quantity of bits required for binary representation of each piece of discrete data is less than a quantity of bits included in corresponding indication information, n≥1, and n is an integer.

Herein, that the n pieces of discrete data include the common part means that the common part is one of the n pieces of discrete data.

The satellite base station establishes a mapping relationship between limited pieces of discrete data and indication information of a small quantity of bits. When needing to broadcast these pieces of discrete data, the satellite base station may directly indicate these pieces of data by sending indication information that has a mapping relationship with these pieces of data to the terminal device, to reduce bit overheads. A larger value of a quantity of the limited pieces of discrete data indicates a larger quantity of saved bits.

According to a second aspect, this application provides a data broadcast apparatus, applied to a satellite communications system, and configured to perform the method in any one of the first aspect or the possible implementations of the first aspect. The apparatus includes units for performing the method in any one of the first aspect or the possible implementations of the first aspect.

According to a third aspect, this application provides a network device, including a processor and a memory. The memory is configured to store a computer program, and the processor is configured to invoke and run the computer program stored in the memory, so that the network device performs the method in any one of the first aspect or the possible implementations of the first aspect.

Optionally, the network device herein may be, for example, a satellite base station.

According to a fourth aspect, this application provides a computer-readable storage medium. The computer-readable storage medium stores a computer instruction. When the computer instruction is run on a computer, the computer is enabled to perform the method in any one of the first aspect or the possible implementations of the first aspect.

According to a fifth aspect, this application provides a chip, including a processor, where the processor is configured to invoke and run a computer program from a memory, to perform the method in any one of the first aspect and the possible implementations of the first aspect.

Optionally, the chip in the fifth aspect further includes the memory, configured to store the computer program.

Further, optionally, the chip further includes a communications interface, and the communications interface may be an input/output interface or a transceiver. The input/output interface may include an input interface and an output interface.

According to a sixth aspect, this application provides a computer program product, and the computer program product includes computer program code. When the computer program code is run on a computer, the computer is enabled to perform the method in any one of the first aspect or the possible implementations of the first aspect.

In the technical solutions of this application, the satellite base station determines one piece of reference data based on the plurality of pieces of data that need to be broadcast, and calculates the differences between the plurality of pieces of data and the reference data. The differences between the plurality of pieces of data and the reference data have smaller values when compared with these pieces of data, and the differences between the plurality of pieces of data and the reference data also have a smaller value range when compared with these pieces of data. Therefore, compared with directly representing the plurality of pieces of data, representing the reference data and differences between the plurality of pieces of data and the reference data requires a smaller quantity of bits. Therefore, bit overheads for broadcasting the plurality of pieces of data by the satellite base station can be reduced, thereby reducing physical resource overheads.

DESCRIPTION OF EMBODIMENTS

The following describes the technical solutions of this application with reference to the accompanying drawings.

Figure 1:
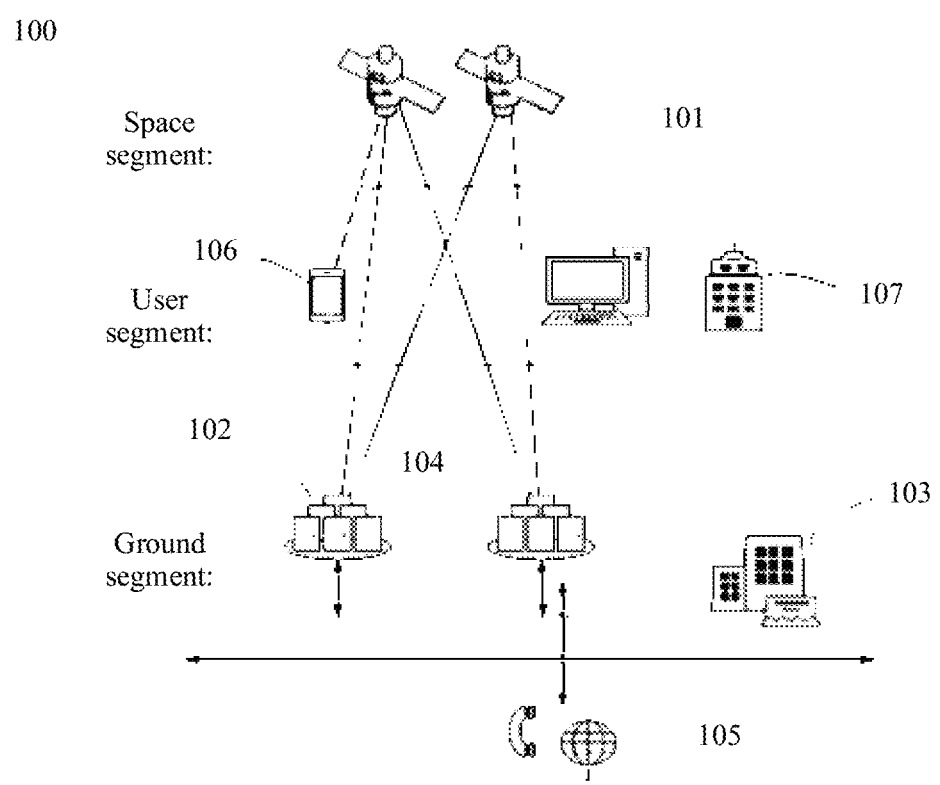
FIG. 1 is a schematic architectural diagram of a satellite communications system.

The technical solutions of this application may be applied to a satellite communications system. Refer to FIG. 1. FIG. 1 is a schematic architectural diagram of a satellite communications system. The satellite communications system 100 usually includes three parts: a space segment, a ground segment, and a user segment. The space segment may include a multi-satellite network 101 formed by a geostationary earth orbit (GEO) satellite, a non-geostationary earth orbit (NGEO) satellite, or both the GEO and the NGEO. The ground segment usually includes a satellite measurement and control center 102, a network control center (NCC) 103, various gateways 104, and the like. The gateway is also referred to as a gateway station. The network control center is also referred to as a system control center (SCC). The user segment includes various terminal devices. The terminal device may be various mobile terminals 106, for example, a mobile satellite phone, or various fixed terminals 107, for example, a communications ground station. A dashed line in FIG. 1 indicates a communication signal between a satellite and a terminal. A solid line indicates a communication signal between the satellite and a device in the ground segment. A double-arrowhead line indicates a communication signal between network elements in the ground segment. In the satellite communications system, the satellite may also be referred to as a satellite base station. In FIG. 1, the satellite base station may transmit downlink data to the terminal device. The downlink data may be transmitted to the terminal device after channel coding, modulation, and mapping. The terminal device may transmit uplink data to the satellite base station. The uplink data may be transmitted to the satellite base station after channel coding, modulation, and mapping.

The satellite measurement and control center 102 in the ground segment has functions such as maintaining, monitoring, and controlling an orbital position and a posture of the satellite, and managing an ephemeris of the satellite. The network control center 103 has functions of user registration processing, identity confirmation, and billing, and other network management functions. In some satellite mobile communications systems, the network control center and the satellite measurement and control center are integrated. The gateway 104 has functions such as call processing, switching, and interfacing with a ground communications network.

The ground communications network 105 is a part of the ground segment of the satellite communications system, and is configured to forward a data packet of a satellite to a core network and send the data packet to a final terminal device. The ground communications network may be a public switched telephone network (PSTN), a public land mobile network (PLMN), or various other private networks, and different ground communications networks require gateways to have different gateway functions.

In some satellite communications systems, the space segment of the satellite communications system may be a multi-layered structure including a management satellite and one or more serving satellites. In networking of the multi-layered satellite communications system, the space segment may include one or more management satellites and serving satellites managed by these management satellites. The satellite or satellite base station mentioned in this application is not limited to a management satellite or a serving satellite.

The satellite base station and the terminal device perform communication by using, but not limited to, the following communications systems, such as: a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunications system (UMTS), a worldwide interoperability for microwave access (WiMAX) communications system, a 5th generation (5G) system, a new radio (NR) system, and the like.

The terminal device in this embodiment of this application needs to access a mobile satellite communications network by using the ground segment of the satellite communications system to perform mobile communication. The terminal device may be referred to as user equipment (UE), an access terminal, a subscriber unit, a subscriber station, a mobile station, a mobile console, a remote station, a remote terminal, a mobile device, a user terminal, a terminal, a wireless communication device, a user agent, or a user apparatus. The terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, or a terminal device in a future evolved public land mobile network (PLMN). Terminal devices, represented by satellite phones and in-vehicle satellite systems, can communicate directly with the satellite. Fixed terminals, represented by ground communication stations, can communicate with the satellite only after relaying by ground stations. The terminal device sets and obtains a communication status by using a wireless transceiver antenna installed, and implements communication.

The following describes the technical solutions of this application.

Figure 2:
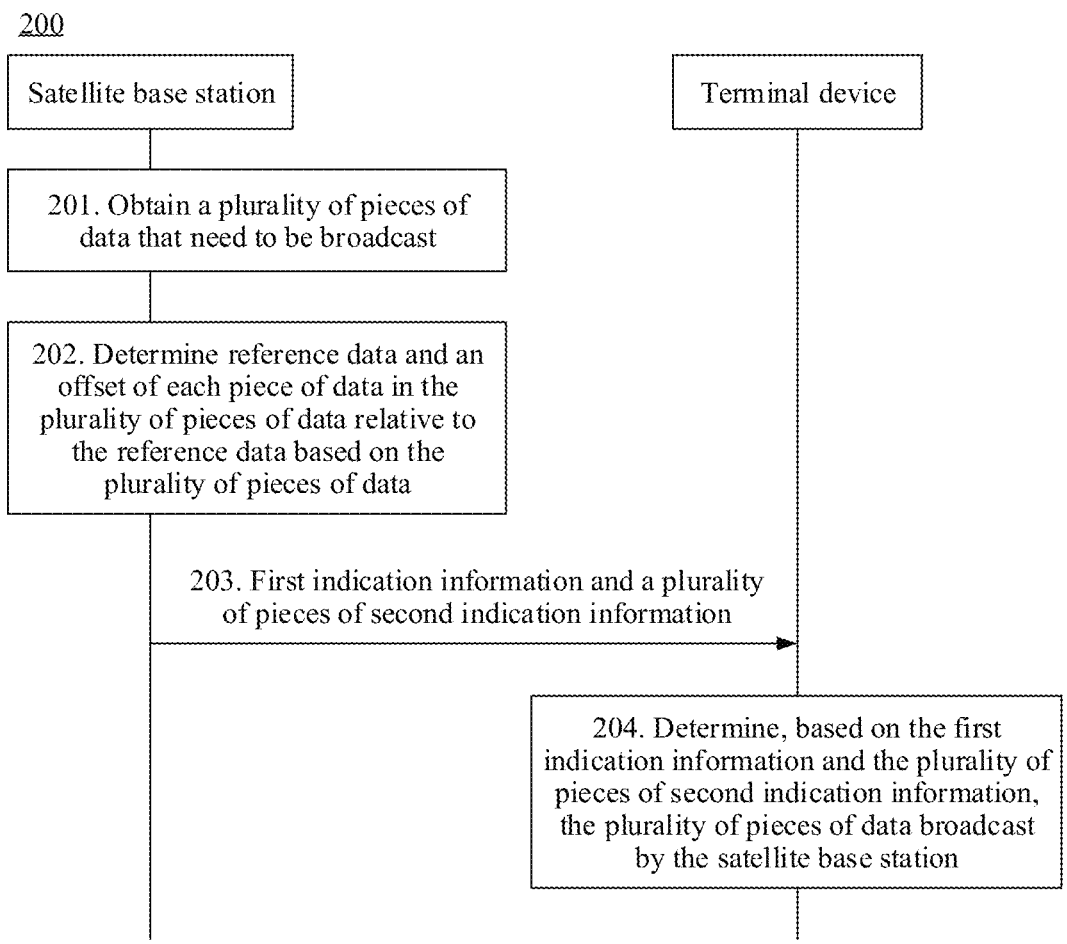
FIG. 2 is a schematic interaction diagram of a data broadcast method 200 according to this application.

Refer to FIG. 2. FIG. 2 is a schematic interaction diagram of a data broadcast method 200 according to this application. The method 200 is applied to a satellite communications system, and is performed by a satellite base station.

201. Obtain a plurality of pieces of data that need to be broadcast to a terminal device.

Herein, the plurality of pieces of data that need to be broadcast by the satellite base station to the terminal device are a same type of data of compensation values of Doppler frequency shifts, change rates of Doppler frequency shifts, transmission delays, change rates of transmission delays, timing advances TAs, change rates of TAs, or angles of a plurality of beams that respectively correspond to the plurality of beams generated by the satellite base station.

In other words, the method 200 may be used for broadcasting when the satellite base station broadcasts, to the terminal device, the compensation values of the Doppler frequency shifts, the change rates of Doppler frequency shifts, the transmission delays, the change rates of transmission delays, the timing advances TAs, the change rates of TAs, or the beam angles of the plurality of pieces of data that respectively correspond to the plurality of beams generated by the satellite base station.

Optionally, the compensation value may be a pre-compensation value or a post-compensation value.

202. The satellite base station determines reference data and a difference between each piece of data in the plurality of pieces of data and the reference data based on the plurality of pieces of data.

Herein, the reference data may be one piece of data selected from the plurality of pieces of data, for example, one piece of data, with a smallest value, of the plurality of pieces of data, or may be one piece of data determined based on values of the plurality of pieces of data. This is not limited herein.

In addition, the difference between each piece of data in the plurality of data and the reference data may be a direct difference between each piece of data and the reference data, or may be an indirect difference between each piece of data and the reference data. For example, assume that there are three pieces of data: 5.8, 6.4, and 7. If 5.8 is used as the reference data, direct difference between the three pieces of data and the reference data are 0, 0.6, and 1.2 respectively. Alternatively, a difference between 5.8 and the reference data is 0, a difference between 6.4 and 5.8 is 0.6, and a difference between 7 and 6.4 is 0.6. Based on the reference data 5.8 and the difference 0, it can be learned that the first piece of data is 5.8. The second piece of data 6.4 is obtained by adding 0.6 to the first piece of data. The third piece of data is obtained by adding 0.6 to 6.4.

203. Send first indication information and a plurality of pieces of second indication information to the terminal device.

The first indication information is used to indicate the reference data. Each piece of second indication information is used to indicate a difference between one piece of data in the plurality of pieces of data and the reference data.

In the technical solution of this application, the satellite base station determines one piece of reference data based on the plurality of pieces of data to be broadcast, and calculates the difference between each piece of data in the plurality of pieces of data and the reference data. The difference between each piece of data and the reference data is smaller than this piece of data, and the difference between the plurality of pieces of data and the reference data also have a smaller range than the plurality of pieces of data. The satellite base station broadcasts the reference data and the difference between each piece of data in the plurality of pieces of data and the reference data, and the terminal device can also determine the plurality of pieces of data broadcast by the satellite base station. Therefore, compared with directly broadcasting these pieces of data, broadcasting, by the satellite base station, one piece of reference data and the difference between each piece of data in the plurality of pieces of data and the reference data requires a smaller quantity of bits, thereby reducing overheads of physical resources.

The first indication information and the second indication information may be used as a separate system information block (SIB), or may be a part of a SIB, or may be a part of remaining minimum system information (RMSI). In other words, the first indication information and the second indication information may be carried in the SIB or RMSI and sent to the terminal device.

Considering that potential resources of the SIB or the RMSI are limited, the first indication information and/or the second indication information may alternatively be transmitted by using a control channel or a data channel.

After receiving the first indication information and the plurality of pieces of second indication information from the satellite base station, the terminal device performs step 204.

204. The terminal device determines, based on the first indication information and the plurality of pieces of second indication information received from the satellite base station, the plurality of pieces of data broadcast by the satellite base station.

The terminal device may also determine, based on the reference data indicated by the first indication information and a difference between one of the plurality of pieces of data indicated by each piece of second indication information and the reference data, each piece of data actually broadcast by the satellite base station.

In specific implementation of the method 200, the satellite base station and the terminal device may agree in advance to use the method 200 for data broadcasting. Therefore, after performing the processing described in step 204 on the received data, the terminal device can determine the plurality of pieces of data broadcast by the satellite base station.

Alternatively, in another implementation, each time before broadcasting data, the satellite base station first indicates, by using configuration information of a small quantity of bits to the terminal device or a ground device, a manner of broadcasting the data. For example, 0 indicates that data is directly broadcast, and 1 indicates that a data broadcast manner provided in this application is used.

The following describes the technical solutions of this application by using examples.

For example, it is found that TAs of different beams of a satellite have a characteristic that an average value of the TAs is far greater than a fluctuation range of the TAs. Therefore, the inventors figure out that a bit width required for broadcasting can be reduced by subtracting one piece of reference data from the TAs. It is assumed that TAs respectively corresponding to 10 beams generated by the satellite base station are shown in Table 1.

TABLE 1

| Beam identifier | TA |
| --- | --- |
| 1 | 5.8 |
| 2 | 6.4 |
| 3 | 7.0 |
| 4 | 7.2 |
| 5 | 6.6 |
| 6 | 6.6 |
| 7 | 5.5 |
| 8 | 4.6 |
| 9 | 4.6 |
| 10 | 4.9 |

It can be learned from Table 1 that a value range of the TAs is from 4.6 to 7.2. When decimals are expressed in binary, they are usually expressed in granularity. For example, if a granularity of 0.1 is used for expression, 4.6=46×0.1, and 7.2=72×0.1. A largest value of the TAs is 7.2. If the 10 TAs in Table 1 are directly broadcast by using an existing solution, each TA requires 7 bits (because $2^6$=64<72, and $2^7$=128>72) for representation. A total of 7×10=70 bits are required for the 10 TAs.

According to the method 200 provided in this application, a reference TA may be selected from the 10 TAs in Table 1. It is assumed that a TA with a smallest value is selected as the reference TA, that is, the reference TA is 4.6. The reference TA is separately subtracted from the 10 TAs in Table 1, and differences obtained are shown in Table 2 for reference.

TABLE 2

| Beam identifier | Difference between each TA and a reference TA |
|---|---|
| 1 | 1.2 |
| 2 | 1.8 |
| 3 | 2.4 |
| 4 | 2.6 |
| 5 | 2 |
| 6 | 2 |
| 7 | 0.9 |
| 8 | 0 |
| 9 | 0 |
| 10 | 0.3 |

It can be learned from Table 2 that a value range of differences between TAs respectively corresponding to the 10 beams and a reference TA is 0 to 2.6. A granularity of 0.1 is used as an example, and a largest value is 2.6=26×0.1. It requires 5 bits to represent 26, and the 10 TAs require 5×10=50 bits. In addition, it further requires 7 bits to represent the reference TA (which is 4.6). Therefore, the 10 TAs require 50×7=57 bits in total. Compared with 70 bits in an existing solution, (70−57)=13 bits can be reduced.

As described above, the first indication information or the second indication information may be carried in the SIB or the RMSI for sending. For example, when the satellite base station indicates a difference between a TA corresponding to one beam and the reference TA, the second indication information may be designed to include three fields in total: a reference TA value (denoted as a ref. TA value), a beam index (denoted as a beam index"), and a difference (denoted as a beam specific TA value) between a specific beam and the reference TA. For example, the ref. TA value occupies 6 bits in total and is used as a reference value of TAs of other beams, a unit is 0.1 ms, and a value is 0 to 63. The beam index occupies 4 bits in total, indicating an index of a specific beam, with a value from 0 to 15. The beam specific TA value occupies 5 bits in total, indicating an offset (or a difference) of the specific beam relative to the reference TA, a unit is 0.1 ms, and a value is 0 to 31.

Because resources of the SIB and the RMSI are limited, the first indication information or the second indication information may alternatively be sent on a control channel or a data channel. For example, the second indication information is designed to include two fields in total: a ref. TA value and a current beam specific TA value. The ref. TA value occupies 6 bits in total and is used as a reference value of subsequent TAs, a unit is 0.1 ms, and a value is 0 to 63. The current beam specific TA value occupies 5 bits in total, indicating a difference between a specific beam and the reference TA, a unit is 0.1 ms, and a value is 0 to 31.

Optionally, TA information of a beam other than a current beam may be transmitted in a data channel. In addition, the TA information of the another beam may be sent based on a request from the terminal device, or may be sent by the satellite base station by default.

In the foregoing description, the beam may alternatively be replaced with a cell.

In addition, the inventors of this application find that the compensation values of the Doppler frequency shifts (also referred to as Doppler frequency shift compensation values for short) has characteristics of: (1) a fluctuation from a negative number to a positive number; and (2) small differences between compensation values of Doppler frequency shifts of adjacent beams. Therefore, the inventors figure out broadcasting compensation values of Doppler frequency shifts of beams by using a characteristic of the compensation values of the Doppler frequency shifts of the beams.

Figure 3:
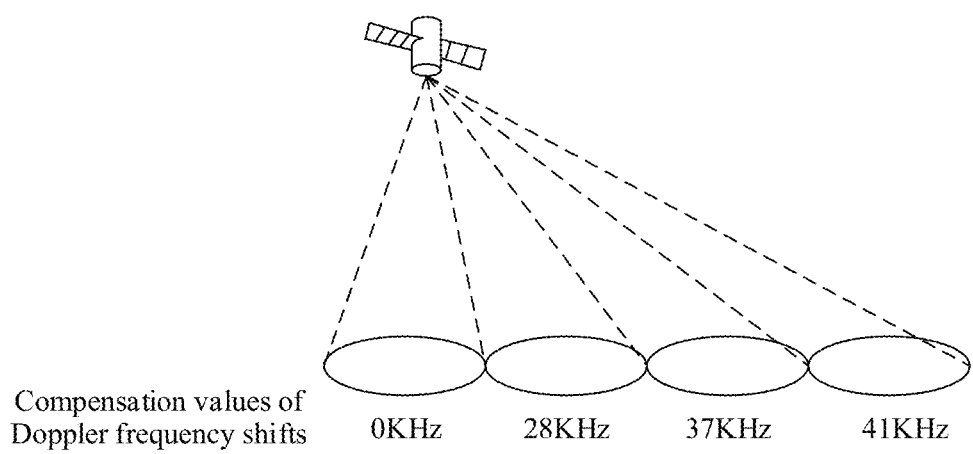
FIG. 3 is a schematic diagram of compensation values of Doppler frequency shifts of different beams generated by a satellite base station.

Refer to FIG. 3. FIG. 3 is a schematic diagram of compensation values of Doppler frequency shifts of different beams generated by a satellite base station. As shown in FIG. 3, a compensation value of a Doppler frequency shift of a beam generated under the satellite base station is 0. In a direction in which the satellite travels, an angle of a beam becomes larger, and a larger beam angle indicates a larger value in compensation values of Doppler frequency shifts corresponding to the beams. A largest value of the compensation values of the Doppler frequency shifts is 41 kHz. However, it is found, through observation of these compensation values, that a largest difference is 28 kHz. Assuming that these compensation values are directly represented in binary, 41 requires 6 bits. However, if differences between these compensation values are represented, the maximum difference 28 requires 5 bits. It can be learned that, when all Doppler compensation values are represented, compared with directly representing the compensation values, representing differences of these compensation values can require a smaller quantity of required bits.

Therefore, the inventors of this application figure out making differences between compensation values of Doppler frequency shifts of different beams, and broadcasting the compensation values of the Doppler frequency shifts of the beams to the terminal device by broadcasting the differences of the compensation values of the Doppler frequency shifts.

Further, to reduce values of the differences, some adjustment may be made to an order of beam identifiers. During broadcasting, only a difference between two adjacent beams is broadcast. This process may be described as the following steps (1) to (4). Steps (1) to (4) may be performed by the satellite base station.

(1) Obtain different beam identifiers and compensation values of Doppler frequency shifts corresponding to the different beam identifiers.

(2) Adjust the beam identifiers based on values of the compensation values of the Doppler frequency shifts.

For example, the compensation values of the Doppler frequency shifts are sorted in descending order or in ascending order.

(3) Sequentially calculate a difference between compensation values of Doppler frequency shifts corresponding to every two sorted adjacent beam identifiers.

(4) Represent, in binary, a compensation value of a Doppler frequency shift corresponding to a sorted first beam identifier and the difference between the compensation values of the Doppler frequency shifts corresponding to every two adjacent stored beam identifiers.

Some other data of the satellite base station also has a law similar to that of the compensation value of the Doppler frequency shift. Therefore, data that has a characteristic similar to the compensation value of the Doppler frequency shift may be processed based on the following process before being broadcast.

The satellite base station sorts, in ascending or descending order, the plurality of pieces of data that need to be broadcast, to obtain a first sequence. The satellite base station determines, as the reference data, the first piece of data or the last piece of data in the first sequence, and then calculates a difference between every two adjacent pieces of data in the first sequence. The first piece of data in the first sequence is used as an example of the reference data, and a second piece of data in the first sequence is obtained by adding the reference data to a difference between the first piece of data and the second piece of data in the first sequence. On this basis, a third piece of data in the first sequence is obtained by adding the second piece of data to a difference between the second piece of data and the third piece of data in the first sequence. By analogy, the terminal device can also determine, based on the reference data and the difference between every two adjacent pieces of data in the first sequence, the plurality of pieces of data that the base station actually needs to broadcast.

Therefore, the satellite base station indicates one piece of reference data by using the first indication information, and then indicates the difference between every two adjacent pieces of data in the first sequence by using the plurality of pieces of second indication information, so that an objective of broadcasting the plurality of pieces of data to the terminal device can also be achieved. In addition, because the first sequence is obtained by sorting values of the plurality of pieces of data in ascending or descending order, values in the first sequence change monotonically, and the difference between every two adjacent pieces of data in the first sequence is smaller. Therefore, the second indication information used to indicate the difference between every two adjacent pieces of data includes a smaller quantity of bits, which can further reduce bit overheads, thereby further reducing physical resource overheads.

For example, the 10 beams generated by the satellite base station and the respective compensation values of the Doppler frequency shifts of the 10 beams are shown in Table 3.

TABLE 3

| Beam identifier | Compensation value of Doppler frequency shift |
|---|---|
| 1 | −32 |
| 2 | −30 |
| 3 | −27 |
| 4 | −19 |
| 5 | −6 |
| 6 | 2 |
| 7 | 9 |
| 8 | −20 |
| 9 | −22 |
| 10 | −14 |

According to an existing method for broadcasting compensation values of Doppler frequency shifts, a range of the compensation values of the 10 Doppler frequency shifts corresponding to the 10 beam identifiers in Table 3 is from +9 to −32. One bit is used to indicate a positive or negative value of a compensation value of a Doppler frequency shift, and 5 bits are used to indicate a magnitude of the compensation value of the Doppler frequency shift. A total of (5+1)×10=60 bits are required.

According to the method in this embodiment of this application, the satellite base station sorts the compensation values of the 10 Doppler frequency shifts in ascending or descending order, for example, in ascending order, so that the compensation values of the 10 Doppler frequency shifts corresponding to the 10 beam identifiers change monotonically, to obtain the first sequence [−32 −30 −27 −22 −20 −19 −14 −6 2 9]. Further, the first piece of data −32 in the first sequence is used as the reference data. A difference between every two adjacent pieces of data in the first sequence is shown in Table 4.

TABLE 4

| Beam identifier | Compensation value of Doppler frequency shift | Difference between every two adjacent compensation values | Reference data |
|---|---|---|---|
| 1 | −32 | 0 | −32 |
| 2 | −30 | 2 | |
| 3 | −27 | 3 | |
| 9 | −22 | 5 | |
| 8 | −20 | 2 | |
| 4 | −19 | 1 | |
| 19 | −14 | 5 | |
| 5 | −6 | 8 | |
| 9 | 2 | 8 | |
| 7 | 9 | 7 | |

It can be learned from Table 4 that a difference between compensation values of two adjacent Doppler frequency shifts ranges from 0 to 8, and may be represented by using 4 bits, and 10 differences require 4×10=40 bits. In addition, the compensation value of the sorted first Doppler frequency shift is −32, indicating that −32 requires 6 bits. In this way, broadcasting the compensation values of the 10 Doppler frequency shifts to a receive end requires a total of (40+6) =46 bits, which is fewer than 60 bits in the direct broadcast manner.

It should be understood that in this example, the satellite base station sends the first indication information and the 10 pieces of second indication information to the terminal device. The first indication information is used to indicate −32, and is a 6-bit binary sequence. Each piece of second indication information is used to indicate one of the 10 differences, and is a 4-bit binary sequence.

The satellite base station sends the first indication information and the plurality of pieces of second indication information to the terminal device. The first indication information is used to indicate the first piece of data or the last piece of data in the first sequence. In Table 4, if the first indication information is used to indicate the first piece of data (which is −32) in the first sequence, the first indication information requires 6 bits, where one bit is used to represent a positive or negative value of the first piece of data, and the other 5 bits are used to represent a magnitude of a value of the first piece of data.

In addition, a value range of the difference between every two adjacent pieces of data in the first sequence is 0 to 8, and there are nine values in total. Therefore, each piece of second indication information includes 4 bits, and each piece of second indication information is used to indicate one of the nine values, namely, values in the third column in Table 4.

It should be particularly noted that a difference between two adjacent pieces of data corresponding to a beam identifier 1 in Table 4 is "0", which means that the first piece of data in the first sequence is used as the reference data. Therefore, a difference between the first piece of data in the first sequence and the reference data is 0. In other words, when the first indication information indicates the first piece of data in the first sequence, the first piece of data in the first sequence is used as a reference value (or reference data) of a difference between two subsequent adjacent pieces of data. After receiving the reference value (the first piece of data or the last piece of data in the first sequence) indicated by the first indication information and the difference indicated by each piece of second indication information, the terminal device can determine the plurality of pieces of data actually broadcast by the satellite base station.

For another example, 10 beams that need to be broadcast by the satellite base station to the terminal device and TAs respectively corresponding to the 10 beams are shown in Table 1. According to the technical solution of this application, the satellite base station first sorts the TAs corresponding to the beams in ascending or descending order, to obtain a first sequence, and uses the first piece of data or the last piece of data in the first sequence as reference data. A difference between every two adjacent pieces of data in the first sequence is shown in Table 5. Table 5 is described by using an example in which the reference data is the first piece of data in the first sequence.

TABLE 5

| Beam identifier | TA | Difference between adjacent TAs | Reference data |
|---|---|---|---|
| 8 | 4.6 | 0 | 4.6 |
| 9 | 4.6 | 0 | |
| 10 | 4.9 | 0.3 | |
| 7 | 5.5 | 0.6 | |
| 1 | 5.8 | 0.3 | |
| 6 | 6.4 | 0.6 | |
| 7 | 6.6 | 0.2 | |
| 8 | 6.6 | 0 | |
| 3 | 7.0 | 0.4 | |
| 10 | 7.2 | 0.2 | |

It can be learned from Table 5 that a range of the TA is from 4.6 to 7.2. When a decimal is expressed in binary, the decimal is usually expressed in granularity. For example, if a granularity of 0.1 is used for expression, $4.6=46\times0.1$, and $7.2=72\times0.1$. A largest value of the TAs is 7.2. If the 10 TAs in Table 4 are directly broadcast in an existing solution, each TA needs to be represented by using 7 bits (because $2^6=64<72$, $2^7=128>72$). A total of $7\times10=70$ bits are required for the 10 TAs.

According to the method in this application, the satellite base station broadcasts, to the terminal device, the difference between every two adjacent TAs in the sequence obtained by sorting the 10 TAs and a reference value of the difference. It can be learned from the third column in Table 5 that a range of the difference is from 0 to 0.6. When the granularity is 0.1, a largest value 0.6 may be represented just by using 3 bits. The reference value 4.6 requires 6 bits (because $2^5=32<46$, and $2^6=64>46$). Therefore, a total of $3\times10+6=36$ bits are required. Compared with 70 bits in the current technology, bit overheads can be reduced.

Figure 4:
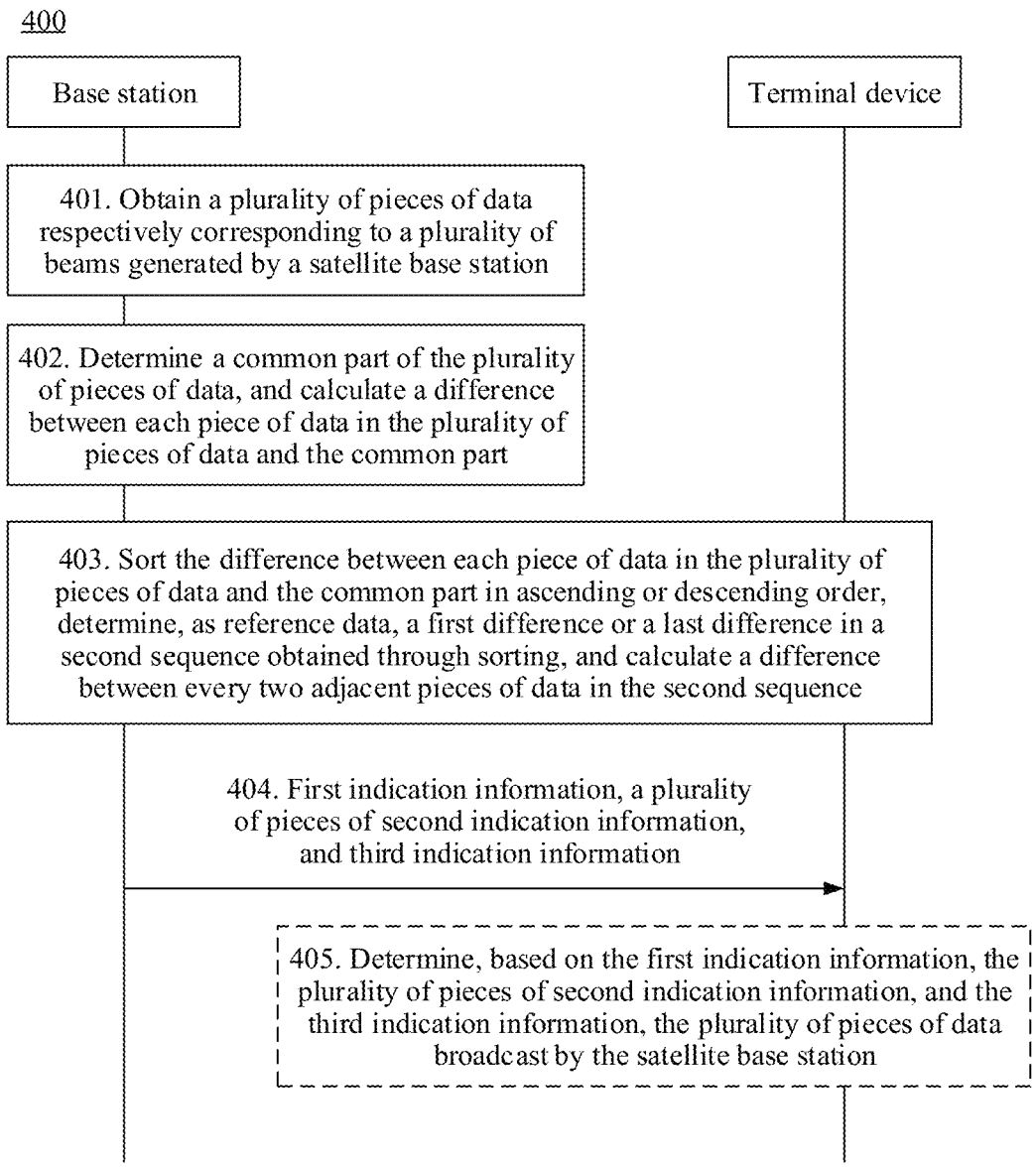
FIG. 4 is a schematic interaction diagram of a data broadcast method 400 according to this application.

In addition, this application further provides a data broadcast method 400. Refer to FIG. 4. FIG. 4 is a schematic interaction diagram of a data broadcast method 400 according to this application. Steps 401 to 404 of the method 400 may be performed by a satellite base station.

401. Obtain a plurality of pieces of data respectively corresponding to a plurality of beams generated by the satellite base station.

402. Determine a common part of the plurality of pieces of data, and calculate a difference between each piece of data in the plurality of pieces of data and the common part.

Herein, the common part may be an average value of the plurality of pieces of data corresponding to the plurality of beams. Alternatively, the common part may be a value close to the average value. Alternatively, the common part may be one piece of data whose value is located at or near the middle in the plurality of pieces of data corresponding to each beam. Alternatively, the common part may be one piece of data, with a smallest value, of the plurality of pieces of data corresponding to the beams, or may be one piece of data agreed on based on the plurality of pieces of data.

403. Sort differences between all of the plurality of pieces of data and the common part in ascending or descending order, determine, as reference data, the first difference or the last difference in a second sequence obtained through sorting, and calculate a difference between every two adjacent pieces of data in the second sequence.

404. Send first indication information, a plurality of pieces of second indication information, and third indication information to a terminal device.

The first indication information is used to indicate the reference data. Each piece of second indication information is used to indicate the difference between every two adjacent values in the second sequence. The third indication information is used to indicate the common part.

Further, the terminal device may further perform step 405.

405. The terminal device determines, based on the first indication information, the plurality of pieces of second indication information, and the third indication information, the plurality of pieces of data broadcast by the satellite base station.

The terminal device may determine, based on the first indication information and the plurality of pieces of second indication information, all data in the second sequence, that is, differences between all of the plurality of pieces of data broadcast by the satellite base station and the common part. The terminal device may determine a value of the common part based on the third indication information, and may determine, with reference to the first indication information, the plurality of pieces of second indication information, and the third indication information, the plurality of pieces of data actually broadcast by the satellite base station.

For example, the satellite base station needs to broadcast, to the terminal device, the TAs corresponding to the 10 beams in Table 1. As analyzed above, if a granularity of 0.1 is used, 70 bits are required for directly representing the 10 TAs.

According to the method 400, a common part 4.6 is first extracted from the 10 TAs, and then differences between the 10 TAs and the common part are separately determined. All differences are sorted in ascending or descending order, to obtain a second sequence [0 0 0.3 0.6 0.3 0.6 0.2 0 0.4 0.2]. A difference between every two adjacent pieces of data in the second sequence is calculated, as shown in Table 6.

TABLE 6

| Beam identifier | TA | Common part | Difference between each TA and the common part | Second sequence | Reference data | Difference between every two adjacent values in the second sequence |
|---|---|---|---|---|---|---|
| 1 | 5.8 | 4.6 | 1.2 | 0 | 0 | 0 |
| 2 | 6.4 |  | 1.8 | 0 |  | 0 |
| 3 | 7.0 |  | 2.4 | 0.3 |  | 0.3 |
| 4 | 7.2 |  | 2.6 | 0.9 |  | 0.6 |
| 5 | 6.6 |  | 2 | 1.2 |  | 0.3 |
| 6 | 6.6 |  | 2 | 1.8 |  | 0.6 |
| 7 | 5.5 |  | 0.9 | 2 |  | 0.2 |
| 8 | 4.6 |  | 0 | 2 |  | 0 |
| 9 | 4.6 |  | 0 | 2.4 |  | 0.4 |
| 10 | 4.9 |  | 0.3 | 2.6 |  | 0.2 |

According to the method 400, the first piece of data in the second sequence is used as the reference data, and the first indication information for representing the reference data requires 1 bit. A largest value in the second sequence is 0.6, and each piece of second indication information requires 3 bits at a granularity of 0.1. Therefore, 10 pieces of second indication information require 3×10=30 bits. The third indication information is used to indicate the common part 4.6, and requires 6 bits also at a granularity of 0.1. Therefore, it can be learned that, broadcasting the TAs of the 10 beams to the terminal device by the satellite base station requires a total of 1+30+6=37 bits.

To further reduce bit overheads, the common part may alternatively be represented in another manner. For example, if the common part broadcast by the satellite base station has only discrete fixed values, and the values are relatively large, a mapping relationship may be established between the discrete values and indication information of a small quantity of bits, to indicate the discrete values by using the mapping relationship.

For example, satellite orbital altitudes are relatively discrete and have only relatively fixed values. An orbital altitude of a low earth orbit (LEO) is usually 300 km to 1500 km, an orbital altitude of a medium earth orbit (MEO) is usually 7000 km to 25000 km, and an orbital altitude of a geostationary earth orbit (GEO) is usually around 36000 km. The LEO is used as an example. Currently, common altitudes are 300 km, 600 km, 700 km, and 1200 km. Therefore, the four altitudes can be broadcast to the terminal device by establishing a mapping relationship between the four common altitudes and 2-bit indication information. For example, a mapping relationship is established between 00, 01, 10, and 11, and the four orbital altitudes respectively, or different identifiers are used to establish a mapping relationship with the four altitudes, as shown in Table 7.

TABLE 7

| Orbital altitude (km) | Representation manner 1 | Representation manner 2 |
|---|---|---|
| 300 | 00 | a |
| 600 | 01 | b |
| 700 | 10 | c |
| 1200 | 11 | d |

In other words, because values of the common part may be discrete, the satellite base station does not need to directly notify the terminal device of a specific value of the common part, and may indirectly indicate specific values of the common part by using some identifiers or a small quantity of bits. This broadcast manner is particularly useful for GEO communication, and can also be used for the LEO. Even if there are some new types and/or altitudes of future satellite orbits, in general, types and altitudes of satellite orbits will be still relatively discrete and limited. Therefore, this indication manner will be still applicable.

The third indication information may be used as a separate SIB, or may occupy a part of a SIB or RMSI. Alternatively, the third indication information may be sent by using a control channel or a data channel.

For example, the third indication information may be designed to include two fields: an orbit type indication (denoted as an orbit type indication) and a difference between a current beam/cell and a reference TA (denoted as a current beam/cell specific TA value). The orbit type indication occupies 4 bits in total, and has a value range of 0 to 15. The current beam/cell specific TA value occupies 5 bits, with a unit of 0.1 ms, and the value ranges from 0 to 31.

For example, an orbit type indication 0110 indicates a satellite with an altitude of LEO 1200 km. If the satellite is directly defined as a base station, a value of the reference TA is 1200 km/3e5 km/s=4 ms. For another example, 1100 indicates a satellite with a GEO altitude. If the satellite is directly defined as a base station, a value of the reference TA is 36000 km/3e5 km/s=120 ms. If the satellite is directly defined as a transponder, a value of the reference TA is 36000 km/3e5 km/s*2=240 ms. In addition, because the GEO has only one orbital altitude, bits used to sub-classify the orbital altitudes of the LEO may be used to indicate other information. For example, 00 in the last two digits in 1100 may be used to indicate a case in which the satellite is a base station, and 01 in the last two digits in 1101 may be used to indicate a case in which the satellite is a transponder. In this way, some bits used to indicate a satellite type may be saved.

The foregoing describes a data sending method provided in this application. The following describes, with reference to a satellite communications system, application of the method in this application to the satellite communications system.

From a perspective of a relatively specific scenario, a satellite may generate a plurality of beams, and each beam may have a plurality of sub-beams. A transmission delay of each sub-beam and a compensation value of a Doppler frequency shift may be broadcast by using the method described in this specification. For example, each beam (for example, a spot beam) generated by a satellite is mapped to a cell, and each cell may generate a plurality of sub-beams for different coverage areas. Beams generated by the satellite may also be directly mapped to a different synchronization signal blocks (SSB). For example, in new radio (NR), these sub-beams appear in a form of synchronization signal blocks. For another example, the satellite base station generates a specific tracking beam for a specific user or user group. The tracking beam may appear in a form of a channel state information-reference signal (CSI-RS) port, and each tracking beam may also be considered as a sub-beam in the cell. When broadcasting a transmission delay to UE, the satellite base station may first broadcast a transmission delay of a common part for the satellite, and then broadcast, on a basis of the transmission delay of the common part, an incremental delay and an incremental delay corresponding to each SSB. Compared with directly broadcasting a delay of each SSB in each cell by the satellite base station, physical resource overheads can be reduced.

From a perspective of a macro scenario, a satellite group includes a plurality of satellites. Different satellites in a satellite constellation, satellites in a specific orbit with a particular altitude, or satellites in a same geographical area share a common transmission delay. The method in the foregoing method 200 or method 400 can be applied herein. To be specific, the common transmission delay shared by these satellites is extracted, to reduce transmission delay representation for each satellite.

For example, it is assumed that a satellite constellation has an overall altitude of about 700 km and contains four orbits with slightly different altitudes, and there are 10 satellites in each orbit. For ease of description, the four orbits with slightly different altitudes are denoted as an orbit 1, an orbit 2, an orbit 3, and an orbit 4 respectively below. According to the method 200 in this application, for a specific satellite (assuming that the satellite is denoted as the satellite A) in a specific orbit (assuming that the orbit is denoted as the orbit 2), a transmission delay of the satellite may be represented as delay 1+delay 2. The delay 1 indicates a common delay of 700 km. The delay 2 indicates a common delay difference between one of the orbit 1 to the orbit 4 and 700 km. It should be understood that for satellites in different orbits, the delay 2 varies. For example, a delay 2 of the orbit 1 may be specifically a delay 2a, a delay 2 of the orbit 2 may be specifically a delay 2b, a delay 2 of the orbit 3 may be specifically a delay 2c, and a delay 2 of the orbit 4 may be specifically a delay 2d. The terminal device may calculate transmission delay information of a satellite in a specific orbit by using the delay 1 and the delay 2 broadcast by the satellite base station. For example, for a satellite in the orbit 2, a transmission delay should be delay 1+delay 2b, and for a satellite in the orbit 3, a transmission delay should be the delay 1 plus the delay 2c.

Further, because the altitudes of the satellite orbits are relatively discrete, the satellite base station may broadcast TAs to the UE by using the foregoing method 400. Optionally, some other equivalent broadcast methods may alternatively be used.

For example, for satellites located at different orbital altitudes, for example, for satellites in a high altitude platform station (high altitude platform station, HAPS), a LEO, a MEO, and a GEO, binary 00, 01, 10, and 11 may be respectively used for representation. For example, 00 indicates the HAPS, 01 indicates the LEO, 10 indicates the MEO, and 11 indicates the GEO.

Further, for a specific orbit, different default altitudes may be respectively represented further by using different binary values. For example, 00, 01, 10, and 11 are respectively used to represent four default altitudes 300 km, 600 km, 700 km, and 1200 km, or multiples of them. In this case, 0101 indicates a satellite with an altitude of 600 km in the LEO orbit. Optionally, the four default altitudes may alternatively be identified by using identifiers. For example, identifiers a, b, c and d indicate altitudes of 300 km, 600 km, 700 km, and 1200 km respectively. Using identifiers to identify discrete altitudes of satellite orbits can avoid transmitting specific values of the orbital altitudes, and has obvious advantages particularly in such a specific scenario in which the orbital altitudes of the satellites are discrete and there are limited values.

From a perspective of system timing design, actual TA adjustment may be used to adjust only a part of transmission, and complete timing alignment on the base station side is abandoned, so that frame boundary alignment, subframe boundary alignment, or symbol alignment can be implemented for an uplink signal on the satellite side. In this case, it is relatively convenient for the satellite base station to broadcast the transmission delay information to the terminal device by using an integer multiple of a scheduling time granularity of a communications system. For example, a length of a subframe in a system is 1 ms, a single transmission delay is 3.2 ms, and a round-trip transmission delay is 6.4 ms. In system design, an uplink TA of the UE is 0.4 ms. Therefore, there is a 6-ms offset when an uplink signal arrives at the satellite base station. In this case, although the TA is only 0.4 ms, the satellite base station still needs to notify the UE due to a 6-ms timing offset caused by a transmission delay. Because the length of the subframe in the system is 1 ms, the satellite base station may broadcast only the digit 6. When the delay is larger, the satellite base station may broadcast an integer multiple of the length of the subframe in the system. When the delay is smaller, the satellite base station may broadcast an integer multiple of a symbol. This broadcast manner can avoid a decimal point when compared with directly broadcasting a number, thereby reducing a quantity of bits (or referred to as a quantity of bytes) required for representing delay information.

In addition, the data broadcast method provided in this application may further reduce overheads of communication between satellites or between a satellite and a ground station. For example, the UE performs handover between satellites at a same orbital altitude. In this case, the handover within the same satellite orbit may not require exchange of information about a transmission delay change caused by an orbital altitude change, and only requires sending of an increment part of a difference. For another example, the UE performs handover between different beams of a satellite, which does not require exchange of transmission delay change information caused by a satellite altitude change.

In the satellite communications system, there are a satellite orbital altitude, a distance between a satellite and a ground coverage area, an angle of a satellite beam, a transmission delay, a transmission delay change rate, a Doppler change rate, a size of a coverage area of a satellite in the ground, and the like. All these characteristic quantities that describe a satellite cell or a satellite beam have a space-related characteristic, and therefore can be sent by using the method provided in this application, thereby reducing a quantity of bits required for transmitting the information, and further reducing physical resource overheads.

The following describes a data broadcast apparatus provided in this application.

Figure 5:
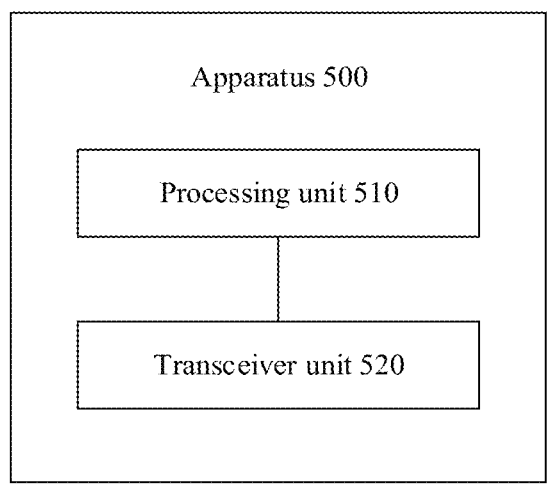
FIG. 5 is a schematic block diagram of a data broadcast apparatus 500 according to this application.

Refer to FIG. 5. FIG. 5 is a schematic block diagram of a data broadcast apparatus 500 according to this application. The apparatus 500 includes a processing unit 510 and a transceiver unit 520.

The processing unit 510 is configured to obtain a plurality of pieces of data that need to be broadcast, where the plurality of pieces of data are a same type of data of compensation values (which may be pre-compensation values or post-compensation values) of Doppler frequency shifts, change rates of Doppler frequency shifts, transmission delays, change rates of transmission delays, timing advances TAs, change rates of TAs, or angles of a plurality of beams that respectively correspond to the plurality of beams generated by a satellite base station.

The processing unit 510 is further configured to determine reference data and a difference between each piece of data in the plurality of pieces of data and the reference data based on the plurality of pieces of data.

The transceiver unit 520 is configured to send first indication information and a plurality of pieces of second indication information to a terminal device, where the first indication information is used to indicate the reference data, and each piece of second indication information is used to indicate a difference between one piece of data in the plurality of pieces of data and the reference data.

Herein, the apparatus 500 may completely correspond to the satellite base station in the method 200. Corresponding units of the apparatus 500 are configured to perform corresponding operations or processing performed by the satellite base station in the method 200 or embodiments of the method 200. For example, the processing unit 510 is configured to perform the steps of obtaining pieces of data respectively corresponding to the plurality of beams generated by the satellite base station, determining the reference data, and calculating the difference between each piece of data in the plurality of pieces of data and the reference data in the method 200. The transceiver unit 520 is configured to perform the step of sending the first indication information and the plurality of pieces of second indication information to the terminal device in the method 200.

Optionally, the processing unit 510 is configured to sort the plurality of pieces of data in ascending or descending order, determine, as the reference data, the first piece of data or the last piece of data in a first sequence obtained through sorting, and calculate a difference between every two adjacent pieces of data in the first sequence. In this case, the second indication information is used to indicate the difference between every two adjacent pieces of data in the first sequence.

Optionally, the processing unit 510 is configured to: determine a common part of the plurality of pieces of data, calculate a difference between each piece of data in the plurality of pieces of data and the common part, sort differences between the plurality of pieces of data and the common part in ascending or descending order, determine, as the reference data, the first difference or the last difference in a second sequence obtained through sorting, and calculate a difference between every two adjacent values in the second sequence. In addition, the first indication information is used to indicate the first difference or the last difference in the second sequence, and each piece of second indication information is used to indicate the difference between every two adjacent differences in the second sequence. In addition, the transceiver unit 520 is further configured to send third indication information, where the third indication information is used to indicate the common part.

Optionally, the processing unit 510 is configured to determine one piece of data, with a smallest value, of the plurality of pieces of data as the common part; or use an average value of the plurality of pieces of data as the common part; or determine, based on values of the plurality of pieces of data, an agreed value as the common part.

Optionally, the processing unit 510 is further configured to determine, based on a mapping relationship that is between n pieces of discrete data and n pieces of indication information and that is agreed on with the terminal device, that the common part corresponds to the third indication information, where a correspondence between the n pieces of discrete data and the n pieces of indication information is agreed on in the mapping relationship. Each piece of indication information is used to indicate corresponding discrete data, the n pieces of discrete data include the common part, a quantity of bits required for binary representation of each piece of discrete data is less than a quantity of bits included in corresponding indication information, $n \geq 1$, and n is an integer.

Optionally, the processing unit 510 may be a processor, and the transceiver unit 520 may be a transceiver. The transceiver includes a receiver and a transmitter, and has both sending and receiving functions.

Optionally, the processing unit 510 may be a processing apparatus, and some or all functions of the processing apparatus may be implemented by using software.

In a possible design, some or all functions of the processing apparatus may be implemented by software. In this case, the processing apparatus may include a memory and a processor. The memory is configured to store a computer program, and the processor reads and executes the computer program stored in the memory, to perform steps implemented internally by the satellite base station in the method 200 and embodiments of the method 200. In another possible design, the processing apparatus includes a processor. A memory for storing a computer program is located outside the processing apparatus, and the processor is connected to the memory by using a circuit/wire, to read and execute the computer program stored in the memory.

In another possible design, some or all functions of the processing apparatus may be implemented by using hardware. In this case, the processing apparatus includes: an input interface circuit, configured to obtain a plurality of pieces of data that need to be broadcast; a logic circuit, configured to determine reference data based on the plurality of pieces of data, and calculate a difference between each piece of data in the plurality of pieces of data and the reference data, where the logic circuit is further configured to generate first indication information and a plurality of pieces of second indication information based on the reference data and the difference between each piece of data in the plurality of pieces of data and the reference data; and an output interface circuit, configured to output the first indication information and the plurality of pieces of second information.

Figure 6:
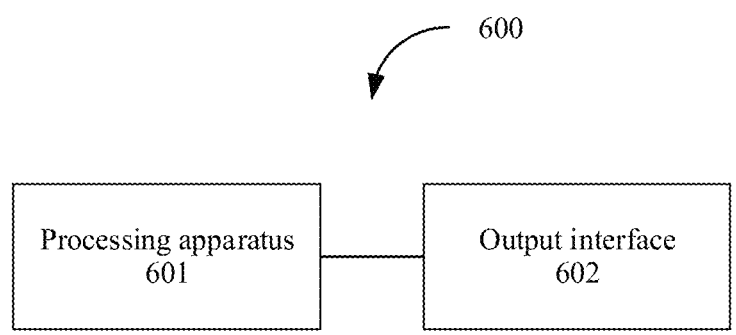
FIG. 6 is a schematic structural diagram of a network device 600 according to this application.

Refer to FIG. 6. FIG. 6 is a schematic structural diagram of a network device 600 according to this application. The network device 600 includes a processing apparatus 601 and an output interface 602.

The processing apparatus 601 is configured to obtain a plurality of pieces of data that need to be broadcast, where the plurality of pieces of data are a same type of data of compensation values of Doppler frequency shifts, change rates of Doppler frequency shifts, transmission delays, change rates of transmission delays, timing advances TAs, change rates of TAs, or angles of a plurality of beams that respectively correspond to the plurality of beams generated by the satellite base station; and determine reference data and a difference between each piece of data in the plurality of pieces of data and the reference data based on the plurality of pieces of data; and generate first indication information and second indication information based on the reference data and the difference between each piece of data in the plurality of pieces of data and the reference data.

The output interface 602 is configured to output the first indication information and a plurality of pieces of second indication information.

In specific implementation, the processing apparatus 601 may be a processor, a chip, or an integrated circuit. The output interface may be an output circuit or a transceiver.

Optionally, the transceiver may be connected to an antenna.

Herein, the network device 600 may be the satellite base station in the method embodiment.

Figure 7:
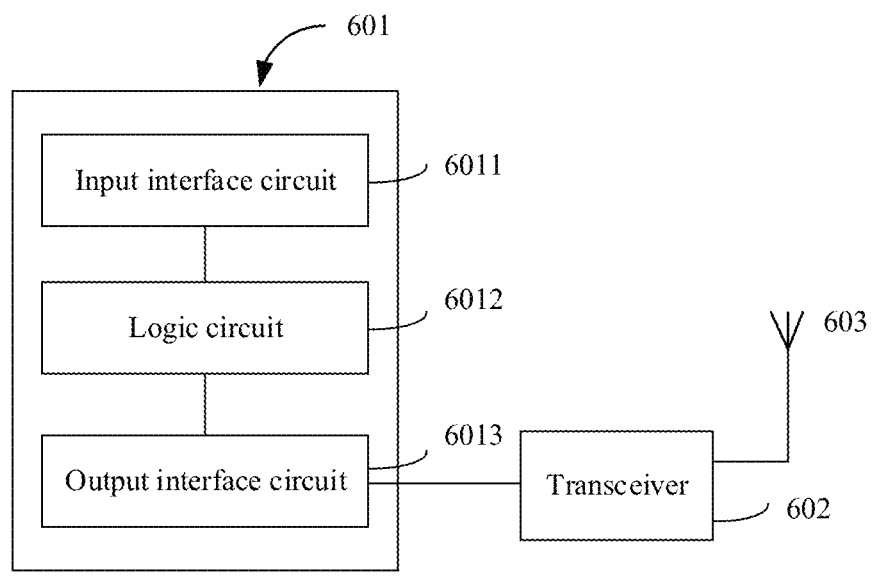
FIG. 7 is a schematic diagram of an internal structure of a processing apparatus according to this application.

This application further provides a processing apparatus. Refer to FIG. 7. FIG. 7 is a schematic diagram of an internal structure of a processing apparatus according to this application. The processing apparatus 601 includes an input interface circuit 6011, a logic circuit 6012, and an output interface circuit 6013.

The input interface circuit 6011 is configured to obtain a plurality of pieces of data that need to be broadcast, where the plurality of pieces of data are a same type of data of compensation values of Doppler frequency shifts, change rates of Doppler frequency shifts, transmission delays, change rates of transmission delays, timing advances TAs, change rates of TAs, or angles of a plurality of beams that respectively correspond to the plurality of beams generated by the satellite base station.

The logic circuit 6012 is configured to determine reference data and a difference between each piece of data in the plurality of pieces of data and the reference data based on the plurality of pieces of data; and generate first indication information and a plurality of pieces of second indication information based on the reference data and the difference between each piece of data in the plurality of pieces of data and the reference data.

The output interface circuit 6013 is configured to output the first indication information and the plurality of pieces of second indication information.

Optionally, a part or all of the procedure of the data broadcast method 200 provided in this application may be implemented by using software. In this case, the processing apparatus 601 may include a processor and a memory. The memory is configured to store a computer program, and the processor is configured to execute the computer program stored in the memory, to perform the method in any embodiment of this application.

Herein, the memory may be a physically independent unit, or may be integrated with the processor.

In another optional embodiment, the processing apparatus 601 may include only a processor, and a memory for storing a computer program is located outside the processing apparatus. The processor is connected to the memory by using a circuit/wire and is configured to read and execute the computer program stored in the memory, to perform the method of any embodiment.

Figure 8:
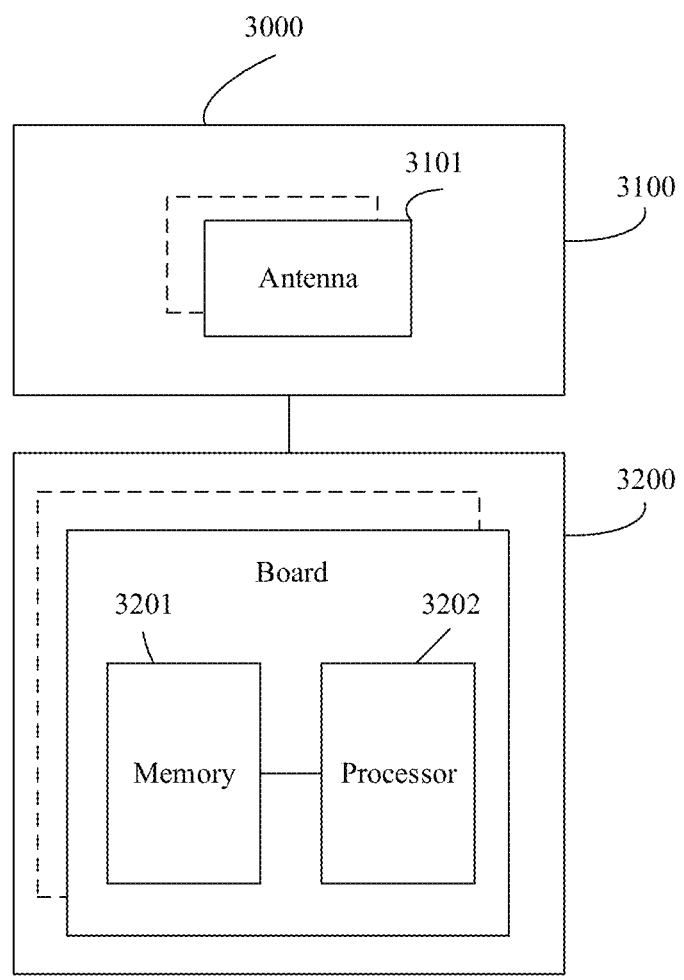
FIG. 8 is a schematic structural diagram of a network device 3000 according to this application.

Refer to FIG. 8. FIG. 8 is a schematic structural diagram of a network device 3000 according to this application. The network device may be applied to the communications system shown in FIG. 1, to perform functions of the satellite base station in the data broadcast method provided in this application.

As shown in FIG. 8, the network device 3000 may include one or more radio frequency units 3100 and one or more baseband units 3200. The radio frequency unit 3100 is mainly configured to send and receive a radio frequency signal, and perform conversion between a radio frequency signal and a baseband signal. For example, in the method 200, the radio frequency unit 3100 is configured to send first indication information and plurality of pieces of second indication information to a terminal device, and for another example, send third indication information to the terminal device. The baseband unit 3200 is a control center of the network device 3000, and is mainly configured to implement baseband processing functions, such as channel coding, multiplexing, modulation, and spreading. For example, the baseband unit 3200 may be configured to support the satellite base station in the foregoing method embodiment in performing functions such as: obtaining a plurality of pieces of data that need to be broadcast, determining reference data, calculating a difference between each piece of data in the plurality of pieces of data and the reference data, sorting data in ascending or descending order, and determining a common part of the plurality of pieces of data. The radio frequency unit 3100 and the baseband unit 3200 may be configured together physically, or may be physically separated.

In an example, the baseband unit may include one or more boards. A plurality of boards may commonly support a radio access network (for example, an LTE network) of a single access standard, or may separately support radio access networks (for example, an LTE network, a 5G network, or another network) of different access standards. The baseband unit 3200 further includes a memory 3201 and a processor 3202. The memory 3201 is configured to store a necessary instruction and necessary data. The processor 3202 is configured to control the network device 3000 to perform a necessary action, for example, control the network device 3000 to perform an operation and/or an action performed by the network device in the foregoing method embodiments. The memory 3201 and the processor 3202 may serve one or more boards. To be specific, each board may be separately provided with a memory and a processor. Alternatively, a plurality of boards may share a same memory and processor. In addition, each board may be provided with a necessary circuit.

The network device 3000 shown in FIG. 8 can implement functions of the satellite base station in the method embodiments of this application. For details, refer to descriptions in the method embodiments. To avoid repetition, detailed descriptions are appropriately omitted herein.

Optionally, the processing apparatus in this application may be a chip or an integrated circuit. For example, the processing apparatus may be a field-programmable gate array (FPGA), an application-specific integrated circuit (ASIC), a system on chip (SoC), or a central processing unit (CPU), a network processor (NP), a digital signal processor (DSP), a micro controller unit (MCU), a programmable logic device (PLD), or another integrated chip, or the like.

In addition, this application further provides a communications system, including a satellite base station and a terminal device.

This application further provides a computer-readable storage medium. The computer-readable storage medium stores a computer program. When the computer program is executed by a computer, the computer is enabled to perform the method in any one of the foregoing method embodiments.

This application further provides a computer program product. The computer program product includes computer program code. When the computer program code is run on a computer, the computer is enabled to perform the method in any one of the foregoing method embodiments.

This application further provides a chip, and the chip includes a processor. A memory for storing a computer program is disposed independent of a chip, and the processor is configured to execute the computer program stored in the memory, to perform the method in any method embodiment. Further, the chip may further include a memory and a communications interface. The communications interface may be an input/output interface, a pin, an input/output circuit, or the like.

The processor in the embodiments of this application may be an integrated circuit chip, and has a signal processing capability. In an implementation process, the steps in the foregoing method embodiments may be completed by using a hardware integrated logic circuit in the processor or instructions in a form of software. The processor may be a general-purpose processor, a DSP, an ASIC, an FPGA or another programmable logic device, a discrete gate or a transistor logic device, or a discrete hardware component. The general-purpose processor may be a microprocessor, or the processor may be any conventional processor or the like. The steps of the methods disclosed in the embodiments of this application may be directly executed and completed by a hardware encoding processor, or may be executed and completed by using a combination of hardware and a software module in an encoding processor. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and implements the steps in the foregoing methods in combination with hardware of the processor.

The memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory of the system and methods described in this specification includes but is not limited to these and any memory of another proper type.

A person of ordinary skill in the art may be aware that, units and algorithm steps in the examples described with reference to the embodiments disclosed in this specification may be implemented by electronic hardware or a combination of computer software and electronic hardware. Whether the functions are performed by hardware or software depends on a specific application and a design constraint of the technical solution. A person skilled in the art may use different methods to implement the described functions for each specific application, but it should not be considered that such implementation goes beyond the scope of this application.

The units described as separate parts may or may not be physically separate, and parts displayed as units may or may not be physical units, that is, may be located in one position, or may be distributed on a plurality of network units. Some or all of the units may be selected based on an actual requirement to achieve objectives of the embodiments of this application.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The software product is stored in a storage medium, and includes instructions for enabling a computer device (which may be a personal computer, a server, or a network device) to perform all or some of the steps of the methods described in the embodiments of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. The protection scope of this application shall be subject to the protection scope of the claims.

The invention claimed is:

1. A data broadcast method, comprising:
   obtaining, by a satellite base station, a plurality of pieces of data that are to be broadcast, wherein the plurality of pieces of data are a same type of data comprising compensation values of Doppler frequency shifts, change rates of Doppler frequency shifts, transmission delays, change rates of transmission delays, timing advances (TAs), change rates of TAs, or angles of a plurality of beams that respectively correspond to a plurality of beams generated by the satellite base station;
   determining, by the satellite base station, reference data and a difference between each piece of data in the plurality of pieces of data and the reference data; and
   sending, by the satellite base station, first indication information and a plurality of pieces of second indication information to a terminal device, wherein the first indication information indicates the reference data, and each piece of second indication information indicates a difference between one piece of data in the plurality of pieces of data and the reference data.

2. The method according to claim 1, wherein the determining, by the satellite base station, the reference data and the difference between each piece of data in the plurality of pieces of data comprises:
   sorting, by the satellite base station, the plurality of pieces of data in ascending or descending order, determining, as the reference data, the first piece of data or the last piece of data in a first sequence obtained through sorting, and calculating a difference between every two adjacent pieces of data in the first sequence, wherein each piece of second indication information indicates the difference between every two adjacent pieces of data in the first sequence.

3. The method according to claim 1, wherein the determining, by the satellite base station, of the reference data and the difference between each piece of data in the plurality of pieces of data and the reference data comprises:

determining, by the satellite base station, a common part of the plurality of pieces of data, and calculating a difference between each piece of data in the plurality of pieces of data and the common part; and sorting, by the satellite base station, the difference between each piece of data in the plurality of pieces of data and the common part in ascending or descending order, determining, as the reference data, a first difference or a last difference in a second sequence obtained through sorting, and calculating a difference between every two adjacent values in the second sequence, wherein the first indication information indicates the first difference or the last difference in the second sequence, and each piece of second indication information indicates the difference between every two adjacent values in the second sequence; and the method further comprises:

sending, by the satellite base station, third indication information to the terminal device, wherein the third indication information indicates the common part.

4. The method according to claim 3, wherein the determining, by the satellite base station, of the common part of the plurality of pieces of data comprises:

determining, by the satellite base station, one piece of data, with a smallest value, of the plurality of pieces of data as the common part;

determining, by the satellite base station, an average value of the plurality of pieces of data as the common part; or determining, by the satellite base station, an agreed value as the common part based on values of the plurality of pieces of data.

5. The method according to claim 3, wherein before the sending, by the satellite base station, of the third indication information to the terminal device, the method further comprises:

determining, by the satellite base station based on a mapping relationship that is between n pieces of discrete data and n pieces of indication information and that is agreed on with the terminal device, that the common part corresponds to the third indication information, wherein a correspondence between the n pieces of discrete data and the n pieces of indication information is agreed on in the mapping relationship, each piece of indication information indicates corresponding discrete data, the n pieces of discrete data comprise the common part, and a quantity of bits required for binary representation of each piece of discrete data is less than a quantity of bits comprised in corresponding indication information, wherein $n \geq 1$, and n is an integer.

6. A data broadcast apparatus, comprising at least one processor coupled with at least one memory storing programming instructions for execution by the at least one processor to perform operations comprising:

obtaining a plurality of pieces of data that are to be broadcast, wherein the plurality of pieces of data are a same type of data comprising compensation values of Doppler frequency shifts, change rates of Doppler frequency shifts, transmission delays, change rates of transmission delays, timing advances (TAs), change rates of TAs, or angles of a plurality of beams that respectively correspond to a plurality of beams generated by the data broadcast apparatus; and determining reference data and a difference between each piece of data in the plurality of pieces of data and the reference data; and outputting first indication information and a plurality of pieces of second indication information to a terminal device, wherein the first indication information indicates the reference data, and each piece of second indication information indicates a difference between one piece of data in the plurality of pieces of data and the reference data.

7. The apparatus according to claim 6, wherein the operations further comprise:

sorting the plurality of pieces of data in ascending or descending order, determining, as the reference data, the first piece of data or the last piece of data in a first sequence obtained through sorting, and calculating a difference between every two adjacent pieces of data in the first sequence, wherein each piece of second indication information indicates the difference between every two adjacent pieces of data in the first sequence.

8. The apparatus according to claim 6, wherein the operations further comprise:

determining a common part of the plurality of pieces of data, and calculating a difference between each piece of data in the plurality of pieces of data and the common part; and sorting the difference between each piece of data in the plurality of pieces of data and the common part in ascending or descending order, determining, as the reference data, a first difference or a last difference in a second sequence obtained through sorting, and calculating a difference between every two adjacent values in the second sequence, wherein the first indication information indicates the first difference or the last difference in the second sequence, and each piece of second indication information indicates the difference between every two adjacent differences in the second sequence; and outputting third indication information to the terminal device, wherein the third indication information indicates the common part.

9. The apparatus according to claim 8, wherein the operations further comprise:

determining one piece of data, with a smallest value, of the plurality of pieces of data as the common part.

10. The apparatus according to claim 8, wherein the operations further comprise:

determining, based on a mapping relationship that is between n pieces of discrete data and n pieces of indication information and that is agreed on with the terminal device, that the common part corresponds to the third indication information, wherein a correspondence between the n pieces of discrete data and the n pieces of indication information is agreed on in the mapping relationship, each piece of indication information indicates corresponding discrete data, the n pieces of discrete data comprise the common part, and a quantity of bits required for binary representation of each piece of discrete data is less than a quantity of bits comprised in corresponding indication information, wherein n≥1, and n is an integer.

11. The apparatus according to claim 6, wherein the apparatus is a chip.

12. A non-transitory computer-readable storage medium having instructions stored thereon that, when executed by a computer, causes the computer to perform operations comprising:
  obtaining a plurality of pieces of data that are to be broadcast, wherein the plurality of pieces of data are a same type of data comprising compensation values of Doppler frequency shifts, change rates of Doppler frequency shifts, transmission delays, change rates of transmission delays, timing advances (TAs), change rates of TAs, or angles of a plurality of beams that respectively correspond to a plurality of beams generated by a satellite base station; and
  determining reference data and a difference between each piece of data in the plurality of pieces of data and the reference data; and
  outputting first indication information and a plurality of pieces of second indication information to a terminal device, wherein the first indication information indicates the reference data, and each piece of second indication information indicates a difference between one piece of data in the plurality of pieces of data and the reference data.

13. The non-transitory computer-readable storage medium according to claim 12, wherein the operations further comprise:
  sorting the plurality of pieces of data in ascending or descending order,
  determining, as the reference data, the first piece of data or the last piece of data in a first sequence obtained through sorting, and
  calculating a difference between every two adjacent pieces of data in the first sequence, wherein
  each piece of second indication information indicates the difference between every two adjacent pieces of data in the first sequence.

14. The non-transitory computer-readable storage medium according to claim 12, wherein the operations further comprise:
  determining a common part of the plurality of pieces of data, and calculating a difference between each piece of data in the plurality of pieces of data and the common part; and
  sorting the difference between each piece of data in the plurality of pieces of data and the common part in ascending or descending order, determining, as the reference data, a first difference or a last difference in a second sequence obtained through sorting, and calculating a difference between every two adjacent values in the second sequence, wherein;
  the first indication information indicates the first difference or the last difference in the second sequence, and each piece of second indication information indicates the difference between every two adjacent differences in the second sequence; and
  outputting third indication information to the terminal device, wherein the third indication information indicates the common part.

15. The non-transitory computer-readable storage medium according to claim 14, wherein the operations further comprise:
  determining one piece of data, with a smallest value, of the plurality of pieces of data as the common part.

16. The non-transitory computer-readable storage medium according to claim 14, wherein the operations further comprise:
  determining, based on a mapping relationship that is between n pieces of discrete data and n pieces of indication information and that is agreed on with the terminal device, that the common part corresponds to the third indication information, wherein a correspondence between the n pieces of discrete data and the n pieces of indication information is agreed on in the mapping relationship, each piece of indication information indicates corresponding discrete data, the n pieces of discrete data comprise the common part, and a quantity of bits required for binary representation of each piece of discrete data is less than a quantity of bits comprised in corresponding indication information, wherein n≥1, and n is an integer.

17. The non-transitory computer-readable storage medium according to claim 14, wherein the operations further comprise:
  determining an average value of the plurality of pieces of data as the common part.

18. The non-transitory computer-readable storage medium according to claim 14, wherein the operations further comprise:
  determining an agreed value as the common part based on values of the plurality of pieces of data.

19. The apparatus according to claim 8, wherein the operations further comprise:
  determining an average value of the plurality of pieces of data as the common part.

20. The apparatus according to claim 8, wherein the operations further comprise:
  determining an agreed value as the common part based on values of the plurality of pieces of data.

* * * * *